Patented Oct. 6, 1931

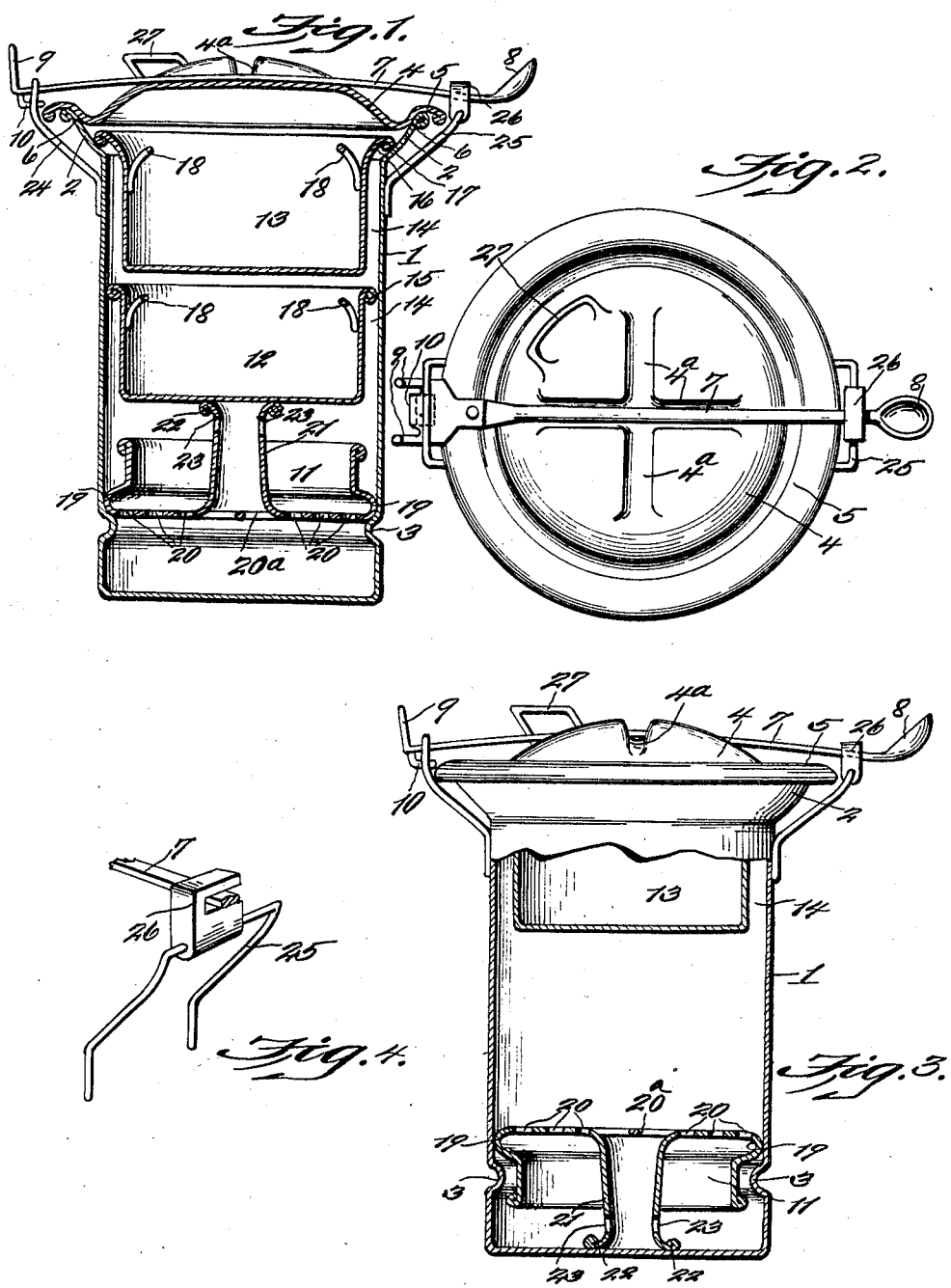

1,826,366

UNITED STATES PATENT OFFICE

VINZENT RUDOLF ROSTEK, OF PHILADELPHIA, PENNSYLVANIA

PRESSURE STEAM COOKER

Application filed October 20, 1930. Serial No. 490,080.

The present invention relates to an improved steam cooker, which is relatively simple in construction, capable of being manufactured for a relatively small cost, as well as being economical in operation, which economizes fuel, time and labor, and when used for roasting, baking, boiling, and in canning, besides being sanitary in every respect, it operates to conserve the food values. The device is easy to clean, and will take up very little room when not in use.

Furthermore this steam cooker includes a tightly fitting cover, which is bulged upwardly including intersecting grooves for use in conjunction with a retaining bar, the bar and the cover possessing resiliency to insure holding the cover in place so that in cooking such foods as cauliflower, cabbage, etc. unpleasant odors are prevented from escaping.

Another purpose is to provide, in a pressure steam cooker of this kind, an interior receptacle or pan with a perforated bottom used in cooking meats and the like, the meat first having been seared on its exterior to prevent excessive loss of the meat nutriment, and which receptacle or pan can be inverted, for the purpose of canning and sterilizing, the steam being allowed to pass upwardly through a central passage and about the other receptacles or containers to be mounted in the cooker.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:—

Figure 1 is a sectional view through the improved steam pressure cooker constructed in accordance with the invention.

Figure 2 is a plan view of the same, showing the bar for holding the cover closed.

Figure 3 is a vertical sectional view showing one of the interior receptacles or pans inverted, for use in sterilization or for canning purposes.

Figure 4 is a detailed perspective view of the handle 25 and with the hook 26.

Referring to the drawings 1 identifies the main casing or shell, which may be made of any suitable material such as metal, glass or stone, preferably copper, and which is preferably cylindrical, though it may be any other shape and any size.

The upper end of the casing or shell 1 has a marginal outwardly extending flange 2, and its wall near the bottom has an internally extending bead or rib 3 formed in the wall of the casing.

A cover 4 is provided, which is bulged upwardly, or in other words concavo-convexed, and it has a marginal flange 5, which conforms at 6 to the flange 2, and on which the cover is supported. The flange 5 overlies the edge of the flange 2 as shown.

The cover has intersecting grooves 4a, either one of which provides for the reception of a transversely disposed bar 7. This bar may be plain at both ends, though as shown in the drawings it is in the form of a tool. This bar or tool has a spoon shaped portion 8 at one end, and a pair of lateral forks 9 at the other end, the spoon being used for stirring certain of the foods, while the forks 9 may be used for engaging an element of a lowermost interior receptacle, for the purpose of extracting the receptacle. The tool or bar also has a hook 10 for the purpose of engaging handles of certain other interior receptacles to be mounted in the casing 1.

Arranged in the casing 1 is a plurality of receptacles or pans 11, 12 and 13, so arranged on the interior of the casing 1 so as to provide a suitable air-space 14, the beads 15 of these receptacles acting to space the receptacles from the inner surface of the casing 1.

However, the upper receptacle 13 is provided with a marginal outwardly extending flange 16, which more or less conforms to the base of the flange 2, there being a bead 17 on the flange 16 to rest on the flange 2 in order to support the receptacle or pan 13.

It will be noted that the various receptacles or pans 11, 12 and 13 are supported in spaced positions, the pan or receptacle 12 being above the receptacle or pan 11, while the receptacle or pan 13 being above the pan 12. The two pans or receptacles 12 and 13 have suitable handles 18, which may be engaged by the hook 10 of the bar or tool, so that the pans can be easily removed.

The lowermost receptacle or pan has adjacent its bottom edge portion a bead 19, which engages on the bead or rib 3, so as to hold the receptacle or pan 11 in a spaced position above the bottom of the casing 1. The bottom of the pan or receptacle 11 is provided with perforations 20, and rising from the central portion of the bottom of the pan or receptacle 11 is a tubular extension 21, which extends higher than the marginal edge of the pan or receptacle 11. The marginal portion at the upper end of the tubular extension is formed with an outwardly flared portion or flange 22, on which the pan or receptacle 12 rests, so as to hold the latter in spaced position above the pan 11. The tubular extension immediately adjacent the flange 22 is provided with perforations 23, through which the steam may pass and spread over the entire under surface of the bottom of the pan or receptacle 12.

Obviously the pan or receptacle 11 can be inverted, and in this instance the flange 22 of the tubular extension 21 rests upon the bottom of the main casing 1. In this position of the receptacle 11 it is possible to place various articles on the inverted bottom of the receptacle 11 for canning purposes and sterilizing. However, when the receptacle 11 is inverted, the other receptacles 12 and 13 are removed, so it is possible to retain the receptacle 13 and remove the pan or receptacle 12.

The main receptacle 1 is provided with a pair of opposite handles 24 and 25, the latter being provided with a pivoted hook 26 for the purpose of engaging the bar 7 to hold it in position. The fact is the bar is placed so as to engage through the handle 24, while the other end of the bar is disposed to engage with the hook 26, for the purpose of retaining the cover in a closed position. The cover is also provided with a handle 27, to allow the cover to be lifted, when it is convenient to have access to the receptacles or pans on the interior of the casing 1. This steam cooker can be used over a coal fire, or over the burner of an electric or gas range.

The forks of the tool or bar may straddle the upper end of the open ended tubular extension 21 just under the beaded flange, so as to extract the pan 11.

This improved pressure steam cooker is of such construction and design as not to require the usual steam escape safety valve. For example, the bar 7 exercises yieldable pressure on the cover 4, in such wise that when there is an excess of steam in the cover or rather the pressure of steam increases, it is possible for the cover to raise and lower, due to the fact that the bar 7 is resilient, thereby allowing the excess of steam to pass off.

The invention having been set forth, what is claimed is:

1. In a pressure steam cooker, the combination with a main casing having a tightly fitting cover, with means for holding it in position on the casing, of an interior pan provided on the marginal edge of its bottom with a rib, the wall of the main casing near its bottom having an inwardly extending rib, with which the rib of the marginal edge of the bottom of the pan engages, whereby the pan may be supported in a spaced position above the bottom of the main casing, said pan having its bottom perforated, whereby the steam may pass therethrough, an open ended tubular extension rising from the center of said pan and extending above the outer marginal upper edge of the pan, acting as a support for a superimposed pan.

2. In a pressure steam cooker, the combination with a main casing having a tightly fitting cover, with means for holding it in position on the casing, of an interior pan provided on the marginal edge of its bottom with a rib, the wall of the main casing near its bottom having an inwardly extending rib, with which the rib of the marginal edge of the bottom of the pan engages, whereby the pan may be supported in a spaced position above the bottom of the main casing, said pan having its bottom perforated, whereby the steam may pass therethrough, an open ended tubular extension rising from the center of said pan and extending above the outer marginal upper edge of the pan, acting as a support for a superimposed pan, the upper marginal edge of the main casing having a flange, and an additional pan with an upper marginal flange including a bead resting upon the flange of the main casing, all of said pans being equally spaced, and also spaced from the inner surface of the casing 1, to provide for the passage of steam about the several pans.

3. In a pressure steam cooker, the combination with a main casing having a tightly fitting cover, with means for holding it in position on the casing, of an interior pan provided on the marginal edge of its bottom with a rib, the wall of the main casing near its bottom having an inwardly extending rib, with which the rib of the marginal edge of the bottom of the pan engages, whereby the pan may be supported in a spaced position above the bottom of the main casing, said pan having its bottom perforated, whereby the steam may pass therethrough, an open ended tubular extension rising from the center of said pan and extending above the outer marginal upper edge of the pan, acting as a support for a superimposed pan, said pan being invertible, whereby the open ended tubular extension may rest on the bottom of the main casing, whereby the inverted bottom of said pan may be used for the support of articles when sterilizing and canning.

In testimony whereof I affix my signature.

VINZENT RUDOLF ROSTEK.